US012339166B2

(12) United States Patent
Han et al.

(10) Patent No.: US 12,339,166 B2
(45) Date of Patent: Jun. 24, 2025

(54) BROADBAND SUPER-RAYLEIGH SPECKLE CORRELATED IMAGING SPECTRAL CAMERA BASED ON DISPERSION COMPENSATION AND IMAGING METHOD THEREOF

(71) Applicant: Shanghai Institute of Optics And Fine Mechanics, Chinese Academy of Sciences, Shanghai (CN)

(72) Inventors: Shensheng Han, Shanghai (CN); Pengwei Wang, Shanghai (CN); Zhentao Liu, Shanghai (CN); Jianrong Wu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 218 days.

(21) Appl. No.: 18/145,847

(22) Filed: Dec. 22, 2022

(65) Prior Publication Data

US 2023/0127376 A1    Apr. 27, 2023

Related U.S. Application Data

(63) Continuation of application No. PCT/CN2021/103979, filed on Jul. 1, 2021.

(30) Foreign Application Priority Data

May 17, 2021 (CN) .......................... 202110533987.3

(51) Int. Cl.
*G01J 3/28* (2006.01)
*G01J 3/02* (2006.01)
*G01J 3/433* (2006.01)

(52) U.S. Cl.
CPC .......... *G01J 3/2823* (2013.01); *G01J 3/0224* (2013.01); *G01J 3/433* (2013.01); *G01J 2003/2826* (2013.01)

(58) Field of Classification Search
CPC ........ G01J 3/2823; G01J 3/0224; G01J 3/433; G01J 2003/2826
See application file for complete search history.

(56) References Cited

U.S. PATENT DOCUMENTS

| 5,706,085 A  * | 1/1998 | Blossey ............... G01B 9/0209 |
| | | 356/512 |
| 2008/0043219 A1* | 2/2008 | Bivolaru .................. G01P 5/26 |
| | | 356/28 |

(Continued)

FOREIGN PATENT DOCUMENTS

| CN | 102818631 | 12/2012 |
| CN | 103954357 | 7/2014 |

(Continued)

*Primary Examiner* — Michelle M Iacoletti
*Assistant Examiner* — Jarreas Underwood
(74) *Attorney, Agent, or Firm* — Mei & Mark LLP; Manni Li

(57) ABSTRACT

A broadband super-Rayleigh speckle correlated imaging spectral camera based on dispersion compensation is provided. The imaging scheme comprises, but is not limited to, a pre-compensation scheme, a post-compensation scheme, or a pre-post joint compensation scheme. The device comprises components such as a pre-imaging module, a light filter, a phase modulation module, a relay imaging module, an area array detector, and a computer. According to the present invention, the super-Rayleigh speckle modulation in a broadband is realized by matching the dispersion characteristic of the pre-imaging module or the relay imaging module with the phase modulation module, which is applied to the correlated imaging spectral camera, so that the imag- (Continued)

ing quality of the correlated imaging spectral camera at a low signal-to-noise ratio is improved.

4 Claims, 2 Drawing Sheets

(56) References Cited

U.S. PATENT DOCUMENTS

| | | | |
|---|---|---|---|
| 2014/0049779 A1* | 2/2014 | Tin | G01N 21/474 356/456 |
| 2017/0126990 A1* | 5/2017 | Han | G01J 3/18 |
| 2019/0235084 A1* | 8/2019 | Heussner | G01S 17/931 |

FOREIGN PATENT DOCUMENTS

| | | | | |
|---|---|---|---|---|
| CN | 105043543 A | * | 11/2015 | |
| CN | 204944676 U | * | 1/2016 | |
| CN | 109520619 A | * | 3/2019 | G01J 3/2823 |
| CN | 110716303 A | | 1/2020 | |
| CN | 111190327 A | * | 5/2020 | G03B 42/02 |

* cited by examiner

BROADBAND SUPER-RAYLEIGH SPECKLE CORRELATED IMAGING SPECTRAL CAMERA BASED ON DISPERSION COMPENSATION AND IMAGING METHOD THEREOF

CROSS-REFERENCE TO RELATED APPLICATIONS

The subject application is a continuation of PCT/CN2021/103979 filed on Jul. 1, 2021, which in turn claims priority on Chinese Patent Application No. 202110533987.3 filed on May 17, 2021. The contents and subject matters of the PCT international stage application and Chinese priority application are incorporated herein by reference.

TECHNICAL FIELD

The present invention relates to a method for realizing super-Rayleigh speckle modulation in a broad spectrum band by matching the dispersion characteristic compensation of a pre-imaging module or a relay module, which is applied to a correlated imaging spectrum camera.

BACKGROUND ART

A spectral imaging technology has both imaging and spectral detection abilities and obtains the spectral distribution of each spatial point while detecting the spatial information of an object, thus, the physical and chemical characteristics of the target are effectively revealed. The spectral imaging technology has broad application prospects in space remote sensing, medical biology, national defense security, food security, and other fields. According to the different ways of obtaining information, the spectral imaging technology can be divided into optical mechanical scanning, push scanning, staring, and snapshotting. The snapshot spectral imaging capable of obtaining a three-dimensional data cube in a single exposure is a hot area in the current research field of spectral imaging. Nowadays, the mainstream snapshot spectral imaging can be divided into two types of methods respectively based on amplitude modulation and phase modulation. Phase modulation has attracted much attention because of its maximum energy utilization.

A compressed sensing broadband hyperspectral imaging system based on random grating disclosed in Chinese Patent number ZL201410348475.X to Han, Shensheng et al. encodes the spatial and spectral information of the object onto a two-dimensional detector by random grating and can obtain broadband spectral image information through single exposure. However, the system adopts random phase modulation and generated speckles meet Rayleigh distribution, so it is difficult to obtain high-quality reconstructed images at a low signal-to-noise ratio. In order to improve the anti-noise ability of the spectral imaging, a correlated imaging spectral camera based on a non-Rayleigh speckle field and an imaging method thereof is disclosed in Chinese Patent number CN109520619B to Han, Shensheng et al., wherein a super-Rayleigh speckle field with a contrast greater than 1 has high contrast, a strong anti-noise ability, an important application value and can improve the image quality of high-order correlated imaging. However, a non-Rayleigh modulation method in the patent has the problems that the application spectrum band is too narrow, the resolution ratio and the contrast decrease when the wavelength deviates from the central wavelength, and so on, therefore, the application of the modulation method in spectral imaging is limited, and the advantages of super-Rayleigh speckles in anti-noise performance and reconstruction accuracy improvement can not be fully exerted.

SUMMARY OF THE INVENTION

The present invention provides a broadband snapshot spectral correlated imaging with a high detection signal-to-noise ratio, overcomes that a correlated imaging spectral camera based on a non-Rayleigh speckle field and an imaging method have the problems of too narrow super-Rayleigh speckle modulation wave bands and incapability of giving full play to the characteristic of a strong anti-noise performance of super-Rayleigh speckles and that applications of the spectral camera in spectral imaging are limited, and provides a broadband super-Rayleigh speckle correlated imaging spectral camera based on dispersion compensation.

The present invention comprises a pre-imaging module, a band-pass light filter, a phase modulation module, a relay imaging module, a photoelectric detector, and a computer. According to the requirements of different parts, the present invention may comprise a pre-compensation scheme (the pre-imaging module meets specific dispersion requirements) and a post-compensation scheme (the relay module meets specific dispersion requirements).

In the present invention, the pre-imaging module or the relay imaging module meeting specific dispersion requirements realizes the super-Rayleigh speckle modulation in broadband by imaging relationship compensation. According to the pre-compensation scheme, objects with different wavelengths are imaged to different first imaging plane. According to the post-compensation scheme, speckles at different positions behind the phase modulator are subjected to relay imaging to the area array detector.

In the present invention, the band-pass light filter is configured for filtering out stray light outside the working spectrum band and improving a signal-to-noise ratio of the imaging system.

In the present invention, the phase modulation module is configured for loading a specific phase distribution diagram and performing phase modulation on a light field (including but not limited to a transmission-type spatial light modulator, a reflection-type spatial light modulator, a customized photoetching phase plate, etc.); and when the phase modulator is the spatial light modulator, the phase modulation module should also comprise a polarizer.

In the present invention, the broadband super-Rayleigh speckle correlated imaging spectral camera based on dispersion compensation comprises components such as the pre-imaging module, the band-pass light filter, the phase modulation module, the relay imaging module, the area array detector, and the computer. Signal light of objects passes through the pre-imaging module in turn; the objects with different wavelengths are imaged to first imaging surfaces with corresponding wavelengths. Then the light passes through the band-pass light filter and is irradiated to the phase modulation module. If the phase modulation module is the reflection-type spatial light modulator, the light is reflected to the area array detector by a beam splitter after returning along the original path, and then is imaged to the area array detector by the post-imaging system and collected by the area array detector.

According to the pre-compensation scheme of the present invention, the structure and material of the pre-imaging module are designed to make the focal length $f_1(\lambda)$ of the pre-imaging module meet the following conditions:

$$\frac{1}{f_1(\lambda)} = \frac{1}{D_1} + \frac{1}{D_2 - z_1(\lambda)},$$

wherein $D_1$ is the distance from an imaging target to the pre-imaging module, $D_2$ is the distance from the pre-imaging module to the phase modulation module, that is, the pre-imaging module images an object image with a wavelength of $\lambda$ to a position $z_1(\lambda)$ in front of the phase modulation module, wherein the distance $z_1(\lambda)$ meets:

$$z_1(\lambda) = \frac{\lambda_1 z_2}{\lambda z'_2 - \lambda_1 z_2} z'_2$$

$$\frac{1}{D_3 - z'_2} + \frac{1}{D_4} = \frac{1}{f_2},$$

wherein $\lambda_1$ and $z_2$ are a reverse propagation wavelength and a distance at which the super-Rayleigh speckles are reversely propagated by a reverse propagation method to obtain the phase distribution diagram required by the phase modulation module; the speckles at a distance of $z_2'$ from the phase modulation module are imaged to the area array detector by the relay imaging module (the focal length being $f_2$), that is, the following imaging formula is met:

$$\frac{1}{D_3 - z'_2} + \frac{1}{D_4} = \frac{1}{f_2},$$

wherein $D_3$ is the distance from the phase modulation module to the relay imaging module, $D_4$ is the distance from the relay imaging module to the area array detector, and at the moment, the focal length $f_2$ of the relay imaging module is a constant;

or the focal length $f_2(\lambda)$ of the relay imaging module meets the following conditions:

$$\frac{1}{f_2(\lambda)} = \frac{1}{D_4} + \frac{1}{D_3 - z'_2(\lambda)},$$

wherein $D_3$ is the distance from the phase modulation module to the relay imaging module, $D_4$ is the distance from the relay imaging module to the area array detector, where the distance $z_2'(\lambda)$ meets $$z'_2(\lambda) = \frac{\lambda_1 z_2}{\lambda z_1 - \lambda_1 z_2} z_1,$$

wherein $\lambda_1$ and $z_2$ are a reverse propagation wavelength and a distance at which the super-Rayleigh speckles are reversely propagated by a reverse propagation method to obtain the phase distribution diagram required by the phase modulation module, and where the distance $z_1$ meets the following imaging formula:

$$\frac{1}{D_2 - z_1} + \frac{1}{D_1} = \frac{1}{f_1},$$

wherein $D_1$ is the distance from the imaging target to the pre-imaging module, $D_2$ is the distance from the pre-imaging module to the phase modulation module, and at the moment, the focal length $f_1$ of the pre-imaging module is a constant.

Specifically, the imaging method comprises the following steps:

Step one. using phase retrieval to obtain a phase distribution diagram required by super-Rayleigh speckles, or reversely propagating the super-Rayleigh speckles at a wavelength of $\lambda_1$ and a distance $z_2$ by the reverse propagation of the light field to obtain the phase distribution diagram of the corresponding field, and then loading the phase distribution diagram onto the phase modulator;

Step two. calibration process: calibrating a measurement matrix A of the super-Rayleigh modulation correlated imaging spectral camera based on dispersion compensation in advance by using the patent "Acquisition Method of Measurement Matrix of Compressed Spectral Imaging System" (Chinese Patent number: ZL201410161282.3), which is incorporated herein by reference, and storing in the computer; at the moment, the area array detector will obtain a series of super-Rayleigh speckle fields subjected to dispersion compensation, and there is a relatively large speckle contrast in the working spectrum band;

Step three. detection process: placing an object to be detected in the field of view of the system, and exposing the area array detector once to obtain a corresponding detection light signal Y, which is stored in the computer; and Step four. reconstruction process: reconstructing by an image recovery algorithm or a deep learning network and the like to obtain a multi-spectral reconstructed image of the target according to the calibrated measurement matrix A and the detection light signal Y.

Compared with the existing technology, the present invention has the following technical effects: while the exiting technology is only designed for single wavelength speckles, the present invention realizes the super-Rayleigh speckle modulation in a broadband by using the dispersion characteristic compensation of the pre-imaging module or the relay imaging module, which is applied to the correlated imaging spectral camera, so that the anti-noise performance of the super-Rayleigh speckles can be fully exerted, and the reconstructed image quality in the working full spectrum band at a low signal-to-noise ratio is obviously improved.

Reference numbers used in the figures are: 1—pre-imaging module, 2—band-pass light filter, 3—photoetching phase plate, 31—transmission-type spatial light modulator, 32—reflection-type spatial light modulator, 33—polarizer, 34—beam splitter, 4—relay imaging module, 5—area array detector, and 6—computer.

DETAILED DESCRIPTION OF THE INVENTION

Drawings and embodiments are combined below for further illustrating the broadband super-Rayleigh speckle correlated imaging spectral camera based on dispersion compensation provided by the present invention, but are not intended to limit the scope of protection of the present invention.

Embodiment I. Phase Modulation Module Being Photoetching Phase Plate

Figure 1:
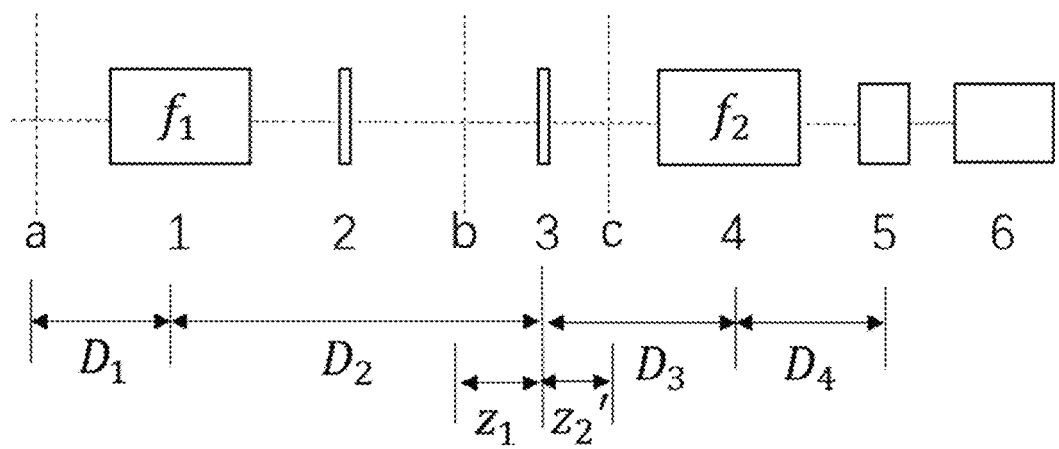
FIG. 1 shows the structure of the broadband super-Rayleigh speckle correlated imaging spectral camera based on dispersion compensation where the phase modulation module is a photoetching phase plate in the first embodiment of the present invention.

As shown in FIG. 1, the broadband super-Rayleigh speckle correlated imaging spectral camera based on dispersion compensation comprises a pre-imaging module 1, a band-pass light filter 2, a photoetching phase plate 3, a relay imaging module 4, an area array detector 5, and a computer 6. Incident light passes through the pre-imaging module 1 in turn; then the light passes through the band-pass light filter 2 and is irradiated to the photoetching phase plate 3; and finally, the light is imaged to the area array detector 5 by the relay imaging system 4 and collected by the detector.

Figure 2:
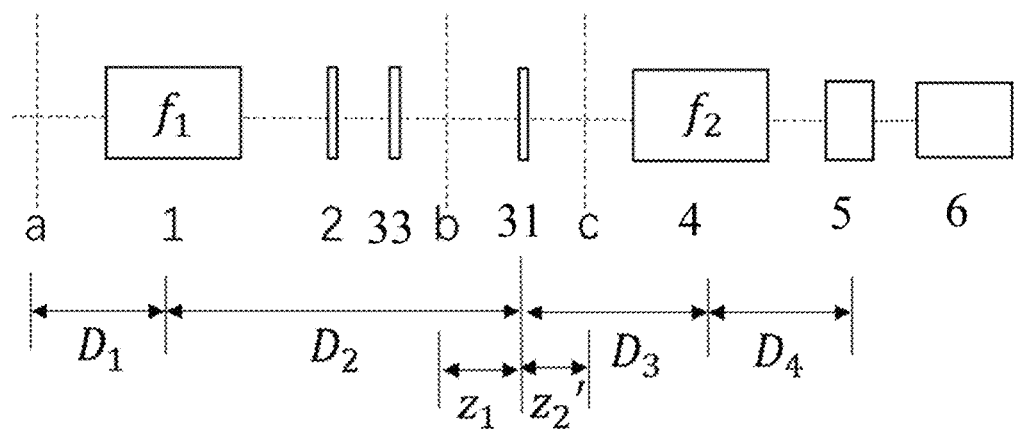
FIG. 2 shows the structure of the broadband super-Rayleigh speckle correlated imaging spectral camera based on dispersion compensation where the phase modulation module is a transmission-type spatial light modulator in the second embodiment of the present invention.

Embodiment II. Phase Modulation Module Being Transmission-Type Spatial Light Modulator As shown in FIG. 2, the broadband super-Rayleigh speckle correlated imaging spectral camera based on dispersion compensation comprises the pre-imaging module 1, the band-pass light filter 2, a polarizer 33, the transmission-type spatial light modulator 31, the relay imaging module 4, the area array detector 5, and the computer 6. Incident light passes through the pre-imaging module 1 in turn; then the light passes through the band-pass light filter 2 and the polarizer 33 and is irradiated to the transmission-type spatial light modulator 31; and finally, the light is imaged to the area array detector 4 by the relay imaging system 31 and collected by the detector.

Figure 3:
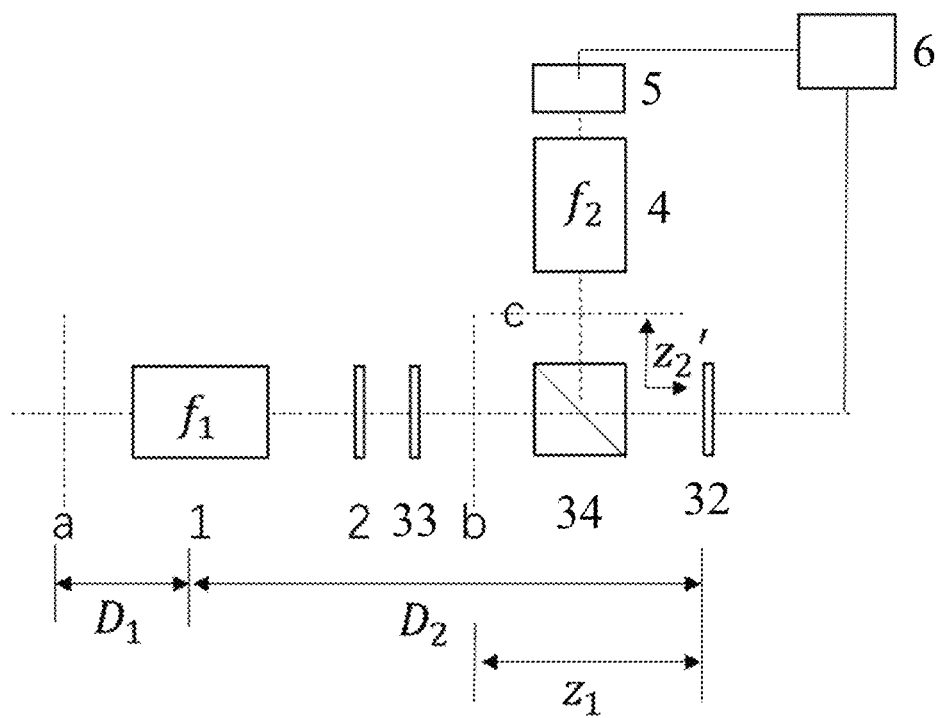
FIG. 3 shows the structure of the broadband super-Rayleigh speckle correlated imaging spectral camera based on dispersion compensation where the structure of the broadband super-Rayleigh speckle correlated imaging spectral camera based on dispersion compensation where the phase modulation module is a reflection-type spatial light modulator in the third embodiment of the present invention.

Embodiment III. Phase Modulation Module Being Reflection-Type Spatial Light Modulator As shown in FIG. 3, the broadband super-Rayleigh speckle correlated imaging spectral camera based on dispersion compensation comprises the pre-imaging module 1, the band-pass light filter 2, the polarizer 33, a beam splitter 34, the reflection-type spatial light modulator 32, the relay imaging module 4, the area array detector 5, and the computer 6. Incident light passes through the pre-imaging module 1 in turn; then the light passes through the band-pass light filter 2, the polarizer 33, and the beam splitter 34, and is irradiated to the reflection-type spatial light modulator 32; and the light returns along the original path after being modulated by the reflection-type spatial light modulator 32, then is reflected by the beam splitter 34, and is imaged to the area array detector 5 by the relay imaging system 4 and collected by the detector.

An imaging method of the broadband super-Rayleigh speckle correlated imaging spectral camera based on dispersion compensation in the present invention comprises the following specific steps:

Step one. phase loading: using phase retrieval to obtain a phase distribution diagram required by a super-Rayleigh light field, or reversely propagating the super-Rayleigh speckles at a wavelength and a distance by a reverse propagation method of the light field to obtain the phase distribution diagram of the corresponding field, and then loading the phase distribution diagram onto the phase modulator, or machining a corresponding phase plate by using photoeteching.

Step two. calibration process: calibrating a measurement matrix A of the super-Rayleigh modulation correlated imaging spectral camera based on dispersion compensation in advance by using the patent "Acquisition Method of Measurement Matrix of Compressed Spectral Imaging System" (Chinese Patent number: ZL201410161282.3), and storing in the computer. At the moment, the area array detector will obtain a series of super-Rayleigh speckle fields subjected to dispersion compensation, and there is a relatively large speckle contrast in the working spectrum band.

Step three. detection process: placing an object to be detected in the field of view of the system, and exposing the area array detector once to obtain a corresponding detection light signal Y, which is stored in the computer.

Step four. reconstruction process: reconstructing by an image recovery algorithm or a deep learning network and the like to obtain a multi-spectral reconstructed image of the target according to the calibrated measurement matrix A and the detection light signal Y.

In summary, the present invention relates to a broadband super-Rayleigh speckle correlated imaging spectral camera based on dispersion compensation. The super-Rayleigh speckle field is generated in the broadband by the use of the dispersion characteristics of the pre-imaging module or the relay imaging module; and this method is applied to the correlated imaging spectral camera, so that a high-quality reconstructed image can be obtained at a low signal-to-noise ratio.

We claim:
1. A broadband super-Rayleigh speckle correlated imaging spectral camera based on dispersion compensation, comprising
   a pre-imaging module (1),
   a band-pass light filter (2),
   a phase modulation module (3),
   a relay imaging module (4),
   an area array detector (5), and
   a computer (6),
   wherein signal light of objects sequentially pass through the pre-imaging module (1), the band-pass light filter (2), the phase modulation module (3), the relay imaging module (4), and being imaged to and collected by the area array detector (5), and a super-Rayleigh speckle modulation in broadband is performed on the signal light by the pre-imaging module (1) in a pre-compensation scheme or the relay imaging module (4) in a post-compensation,
   the pre-imaging module (1) is configured to image the signal light of the objects with different wavelengths to different first imaging surfaces with corresponding wavelengths,
   the phase modulation module (3) is configured to load a phase distribution diagram generating super-Rayleigh speckles and performing phase modulation on a light field, and
   the relay imaging module (4) is configured to perform relay imaging on the super-Rayleigh speckles at dif- ferent positions behind the phase modulation module (3) to the area array detector (5), and a focal length $f_1(\lambda)$ of the pre-imaging module (1) meets following conditions:

$$\frac{1}{f_1(\lambda)} = \frac{1}{D_1} + \frac{1}{D_2 - z_1(\lambda)},$$

wherein $D_1$ is a distance from an imaging target (a) to the pre-imaging module (1), $D_2$ is a distance from the pre-imaging module (1) to the phase modulation module (3), wherein the pre-imaging module (1) images an object image with a wavelength of $\lambda$ to a position $z_1(\lambda)$ in front of the phase modulation module (3), and the distance $z_1(\lambda)$ meets:

$$z_1(\lambda) = \frac{\lambda_1 z_2}{\lambda z_2' - \lambda_1 z_2} z_2'$$

$$\frac{1}{D_3 - z_2'} + \frac{1}{D_4} = \frac{1}{f_2},$$

wherein $\lambda_1$ and $z_2$ are a reverse propagation wavelength and a distance at which the super-Rayleigh speckles are reversely propagated by a reverse propagation method to obtain a phase distribution diagram required by the phase modulation module (3);

the super-Rayleigh speckles at a distance of $z_2'$ from the phase modulation module (3) are imaged to the area array detector (5) by the relay imaging module (4), and an imaging formula is met:

$$\frac{1}{D_3 - z_2'} + \frac{1}{D_4} = \frac{1}{f_2}$$

wherein $D_3$ is a distance from the phase modulation module (3) to the relay imaging module (4), $D_4$ is a distance from the relay imaging module (4) to the area array detector (5), and $f_2$ is a focal length of the relay imaging module (4), and is either a constant, or $f_2$ is a focal length of the relay imaging module (4) that is $f_2$ (2) and meets the following conditions:

$$\frac{1}{f_2(\lambda)} = \frac{1}{D_4} + \frac{1}{D_3 - z_2'(\lambda)}$$

wherein $D_3$ is the distance from the phase modulation module (3) to the relay imaging module (4), $D_4$ is the distance from the relay imaging module (4) to the area array detector (5), wherein the distance $Z_2'(\lambda)$ meets $$z_2'(\lambda) = \frac{\lambda_1 z_2}{\lambda z_1 - \lambda_1 z_2} z_1,$$

wherein $\lambda_1$ and $z_2$ are a reverse propagation wavelength and a distance at which the super-Rayleigh speckles are reversely propagated by a reverse propagation method to obtain the phase distribution diagram required by the phase modulation module (3), where the distance $z_1$ meets the following imaging formula:

$$\frac{1}{D_2 - z_1} + \frac{1}{D_1} = \frac{1}{f_1},$$

where $D_1$ is the distance from the imaging target (a) to the pre-imaging module (1), $D_2$ is the distance from the pre-imaging module (1) to the phase modulation module (3), and the focal length $f_1$ of the pre-imaging module (4) is a constant.

2. The broadband super-Rayleigh speckle correlated imaging spectral camera based on dispersion compensation according to claim 1, wherein the band-pass light filter (2) is configured for filtering out stray light outside a working spectrum band and improving a signal-to-noise ratio of the imaging system.

3. The broadband super-Rayleigh speckle correlated imaging spectral camera based on dispersion compensation according to claim 1, wherein the phase modulation module (3) comprises a photoetching phase plate, a polarizer and a transmission spatial light modulator, or a polarizer and a reflection spatial light modulator.

4. A method for performing spectral imaging by using the broadband super-Rayleigh speckle correlated imaging spectral camera based on dispersion compensation according to claim 1, comprising:

(i) using phase retrieval to obtain the phase distribution diagram required by super-Rayleigh speckles, or reversely propagating the super-Rayleigh speckles at a wavelength of $\lambda_1$ and a distance of $z_2$ by the reverse propagation of the light field to obtain the phase distribution diagram of the corresponding field, and then loading the phase distribution diagram onto a the phase modulation module;

(ii) calibration process: calibrating a measurement matrix A in advance, storing in the computer (6), and the area array detector (5) obtains a series of super-Rayleigh speckle fields subjected to dispersion compensation, and there is a speckle contrast in the working spectrum band;

(iii) detection process: placing an object to be detected in the field of view of the system, and exposing the area array detector once to obtain a corresponding detection light signal Y, which is stored in the computer; and (iv) reconstruction process: reconstructing the detection light signal Y with the calibrated measurement matrix A to obtain a multi-spectral reconstructed image of the target.

\* \* \* \* \*